Sept. 8, 1942.   F. E. JOHNSON   2,295,480
NUT DEVICE
Filed Sept. 9, 1939
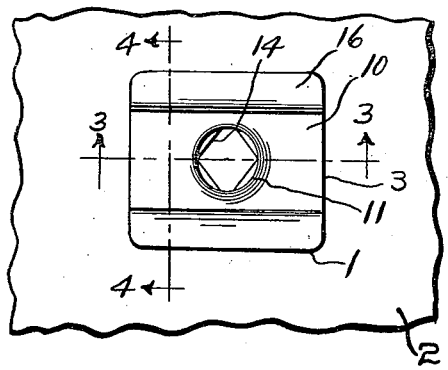
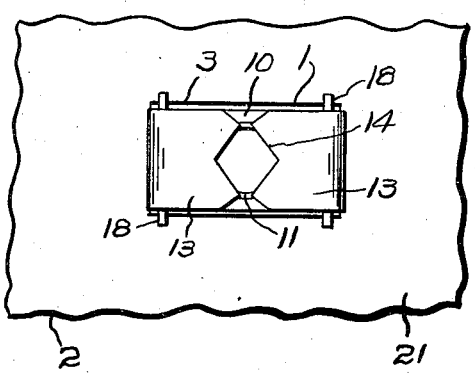
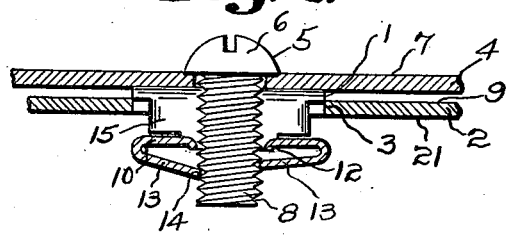
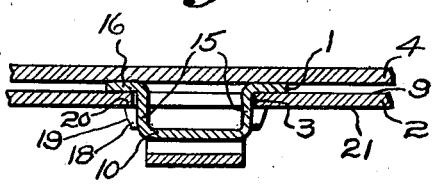
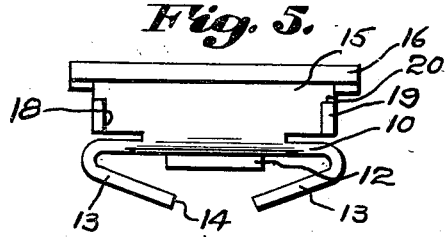
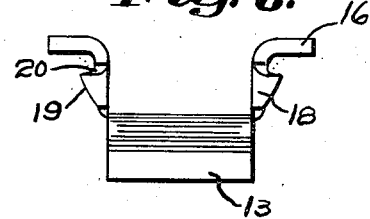
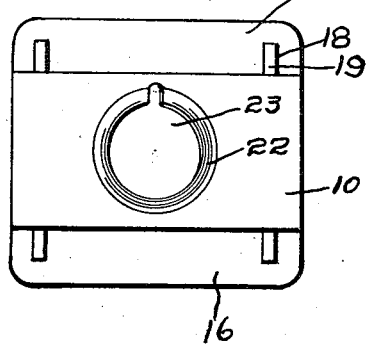
Inventor:
Frank E. Johnson.
by John Todd
Atty.

Patented Sept. 8, 1942

2,295,480

UNITED STATES PATENT OFFICE 2,295,480

NUT DEVICE

Frank E. Johnson, Malden, Mass., assignor to United-Carr Fastener Corporation, Cambridge, Mass., a corporation of Massachusetts Application September 9, 1939, Serial No. 294,161

7 Claims. (Cl. 85—32)

This invention relates to improvements in nut devices of the type adapted to be secured in assembly with a supporting panel from a position on one side only of said panel.

Referring to the drawing in which I have illustrated preferred embodiments of my invention—

Fig. 1 is a top plan view of a supporting panel with one of my improved nut members assembled therewith.

Fig. 2 is a bottom plan view of the installation shown in Fig. 1;

Fig. 3 is a sectional view along the line 3—3 of Fig. 1 showing the manner in which a screw cooperates with the nut member to secure another part to the supporting panel;

Fig. 4 is a sectional view taken along the line 4—4 of Fig. 1 and showing a plate member secured in superposed relation to the supporting panel;

Fig. 5 is a side elevation of my improved nut device per se;

Fig. 6 is an end view of the nut device shown in Fig. 5; and

Fig. 7 is a bottom view of a slightly modified form of nut device.

Referring in detail to my preferred nut installation illustrated in Figs. 1-4, I have shown a nut member 1 secured in snap fastener engagement with a supporting panel 2 through an aperture 3. The aperture 3 is preferably rectangular in form cooperating with the nut member to prevent relative rotation. A part such as a plate member 4 (Figs. 3 and 4) is secured in superposed relation to the panel 2 by a screw or bolt (Fig. 3) having a head 6 engaging the outer surface 7 of the plate member 4 and a threaded shank 8 extending through the plate 4 and the aperture 3 of the support into threaded engagement with the nut device. The nut member, as hereinafter described, has flange portions engaging the outer surface 9 of the support 2 and yieldable attaching portions snapped into engagement with the support through the opening 3 and carrying a threaded portion for threaded engagement with the bolt 5.

Referring in detail to my first form of improved nut device illustrated in Figs. 1-6, I have shown one made entirely of one piece of sheet metal.

The nut device has a relatively flat rectangular base portion 10 having a bolt-receiving opening 11. A circular wall 12 may be drawn from the base so as to surround the opening 11 and project out of the plane of the base 10 on its lower side for a purpose to be described. Spring arms 13—13 integral with the edges of the base 10 at opposed ends extend inwardly toward each other on the lower side of the base. The free ends 14 of the arms 13—13 are in alignment with the opening 11 and the arms are arranged to spring upwardly and outwardly from each other so as to become adjusted to positions between the threads of the screw shank 8 when the same is moved between the free ends 14. When the screw is turned the arms 13—13 are drawn downwardly and inwardly so as to fetch up in tightened engagement with the screw shank. The drawn wall 12 serves to provide a lead for easy entrance of the screw shank through the base and, also, it may act to hold the screw in position for proper engagement with the spring arms.

Attaching portions 15—15 integral with the edges of the base 10 at opposed sides intermediate those sides to which the arms 13—13 are joined, extend outwardly above the base. The attaching portions are resilient so as to be movable toward each other against their normal tension during attachment of the nut to the support, as will be described. Each of the attaching portions in my preferred form has a width which is preferably greater than one-half the length of the side edge to which it is joined. Support-engaging portions or flanges 16—16 are provided at the ends of the attaching portions away from the base 10 for engagement with the upper surface 9 of the support when the fastener is assembled in final position. Lugs 18, which are preferably of triangular shape, are sheared from the attaching portions adjacent their ends and bent into substantially right-angular relation to the respective attaching portions. Each of the lugs 18 provides an inclined camming edge 19 at its outer side and a shoulder 20 at its upper end facing in the direction of the flanges 16 for engaging the lower surface 21 of the support.

Assembly of my nut device with the supporting panel is carried out by moving the nut device through the opening 3 of the panel to engage the camming edges 19 of the lugs 18 with the walls of the opening. As pressure for moving the nut through the opening is continued, the attaching portions 15—15 move toward each other until the shoulders 20 pass through the opening, at which time the attaching portions spring away from each other toward normal position to engage the shoulders behind the surface 21 of the panel while the flanges 16—16 move into superposed relation to the surface 9 of the panel. The nut member is now secured in attachment to the panel and fixed against relative movement while the screw is moved between the arms 13—13 and during tightening of the screw.

Referring to my modified nut device illustrated in Fig. 7, the nut is in every way similar to my first form except that in place of the thread-engaging arms 13—13, I have provided a helical wall 22 surrounding an opening 23 in the base 10 and adapted for threaded engagement with the screw shank when the shank is turned thereinto. Assembly of my second form of nut device with the support is carried out in exactly the way of my first form.

Thus it will be seen that by my invention I provided a nut member of simple construction which is particularly useful in high speed production due to the fact that it may be assembled with a support by hand from a position entirely on one side of the support so as to be fixed in position to receive a screw or bolt.

Although I have illustrated and described preferred embodiments of my invention, I do not wish to be limited thereby as the scope of my invention is best defined by the following claims.

I claim:

1. A nut device formed from sheet metal for engagement with a supporting panel through an opening therein, said nut having a shank in the form of a pair of attaching portions each being rigid in a direction parallel to the axis of said nut, a base portion connecting said attaching portions at one end of the shank, said base portion having axially spaced thread-engaging means associated therewith for cooperative engagement at a plurality of points with a bolt to be extended through said base, support-engaging means extending laterally outwardly from each attaching portion at the other end of said shank, shoulder means extending from said attaching portions at spaced distances from said support-engaging means, said shoulder means being rigid to resist the force tending to deform the same when said nut is tightened down, and said attaching portions being formed of spring material so that said shoulder portions may snap through an aperture in a support and hold the nut in place prior to a bolt being engaged therewith.

2. A nut device formed from sheet metal for engagement with a supporting panel through an opening therein, said nut having a shank in the form of a pair of attaching portions each being rigid in a direction parallel to the axis of said nut, a base portion connecting said attaching portions at one end of the shank, said base portion having reversely extending folds associated therewith for cooperative engagement at a plurality of points with a bolt to be extended through said base, support-engaging means extending laterally outwardly from each attaching portion at the other end of said shank, shoulder means extending from said attaching portions at spaced distances from said support-engaging means, said shoulder means being rigid to resist the force tending to deform the same when said nut is tightened down, and said attaching portions being formed of spring material so that said shoulder portions may snap through an aperture in a support and hold the nut in place prior to a bolt being engaged therewith.

3. A nut device formed from sheet metal for engagement with a supporting panel through an opening therein, said nut having a shank in the form of a pair of attaching portions each being rigid in a direction parallel to the axis of said nut, a base portion connecting said attaching portions at one end of the shank, said base portion having opposed arms positioned below said base for cooperative engagement with a bolt in a plane spaced from said base, support-engaging means extending laterally outwardly from each attaching portion at the other end of said shank, shoulder means extending from said attaching portions at spaced distances from said support-engaging means, said shoulder means being rigid to resist the force tending to deform the same when said nut is tightened down, and said attaching portions being formed of spring material so that said shoulder portions may snap through an aperture in a support and hold the nut in place prior to a bolt being engaged therewith.

4. A nut composed of a single piece of resiliently yieldable stock and of U-shape cross section, the base of said U including an intermediate portion and extensions beyond the ends thereof, each pierced to provide a screw-receiving opening, and shoulder portions extending laterally of each of the branches of said U at spaced points along the length thereof, said branches being adapted to be compressed toward each other to enable certain of said shoulders to snap past the walls of an aperture.

5. A nut of a single piece of resiliently flexible thin material bent into a U-shaped cross section with the base of the U comprising an intermediate portion and folded extensions connected thereto, the branches of said U being turned laterally outwardly, and shoulder portions extending laterally outwardly from each of said branches below the outwardly extending ends thereof, said branches being resiliently compressible toward each other to enable some of said shoulders to snap past the walls of an aperture.

6. A nut of U-shape in cross-section comprising integral branches joined by a base portion, folded extensions connected to said base portion, the base and each extension being pierced to receive a screw, the outer ends of said branches being turned laterally outwardly to form shoulders and additional shoulders extending laterally outwardly from said base portion, in combination with a sheet of material pierced to receive said nut, said additional shoulders being yieldable toward each other upon application of pressure in forcing said nut into said opening whereby said sheet is snared between the sets of shoulders, and a screw extending through both of said openings for securing said sheets together, said screw upon being rotated forcing said additional shoulders against the first named sheet and spreading the folds of said base portion to lock all of the parts in fixed relation.

7. A nut composed of a single piece of resiliently yieldable stock and of U-shape cross section, the base of said U including an intermediate portion and folded extensions connected thereto, said base and extensions being formed to provide a screw receiving opening, and shoulder portions extending laterally of each of the branches of said U at spaced points along the length thereof, said branches being adapted to be compressed toward each other to enable certain of said shoulders to snap past the walls of an aperture.

FRANK E. JOHNSON.